(12) United States Patent
Calamatas

(10) Patent No.: US 6,198,788 B1
(45) Date of Patent: Mar. 6, 2001

(54) ENCODER TEST APPARATUS AND METHOD

(75) Inventor: Philip J. Calamatas, Fabreville Laval (CA)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/401,767

(22) Filed: Sep. 23, 1999

(51) Int. Cl.[7] .................................................. G07C 3/00
(52) U.S. Cl. ................................................ 377/16; 377/17
(58) Field of Search ........................................ 377/16, 17

(56) References Cited

U.S. PATENT DOCUMENTS 4,914,437 * 4/1990 Kibrick et al. ............................ 341/3
5,734,108 * 3/1998 Walker et al. ........................... 73/650

* cited by examiner

Primary Examiner—Margaret R. Wambach
(74) Attorney, Agent, or Firm—James Ray & Associates

(57) ABSTRACT

Apparatus and method for testing an optical encoder used to determine position of a moveable member. The optical encoder supplies a first binary signal indicative of a position of the moveable member and a second binary signal indicative of the position. The first binary signal and the second binary signal are in quadrature relationship. The apparatus has a first delay device connected to receive the first binary signal. The first delay device produces a first delayed binary signal. The apparatus also includes a first logic gate connected to receive the first binary signal and the first delayed binary signal. The first logic gate produces a first edge detection pulse signal. The apparatus further includes a second delay device connected to receive the second binary signal. The second delay device produces a second delayed binary signal. The apparatus further includes a second logic gate connected to receive the second binary signal and the second delayed binary signal. The second logic gate produces a second edge detection pulse signal. The first edge detection pulse signal and the second edge detection pulse signal qualify the optical encoder.

19 Claims, 5 Drawing Sheets

ENCODER TEST APPARATUS AND METHOD

CROSS-REFERENCE TO RELATED APPLICATIONS

The invention described in this patent application is closely related to the following copending patent application: TRANSIT VEHICLE DOOR, Ser. No. 09/099,260 which was filed on Jun. 18, 1998. It is also related to the provisional application: INTELLIGENT DOOR CONTROL UNIT, which was filed on Nov. 25, 1998 and the application: DYNAMIC BRAKE FOR POWER DOOR which was also filed on Nov. 25, 1998. The teachings of the applications and provisional application cited above are hereby incorporated by reference thereto. The applications and provisional application referenced above are assigned to the assignee of the present application.

FIELD OF THE INVENTION

The present invention relates, in general, to test apparatus for optical encoders and, more particularly, the instant invention relates to a test apparatus for an optical encoder used to determine the position of a door driven by a rotary drive member.

BACKGROUND OF THE INVENTION

It is well known in the transit vehicle art to open and close transit vehicle doors by rotating electric motors. In a typical transit vehicle door system a reversible electric motor turns a gear drive which in turn rotates a drive screw. A drive nut mounted on a door hanger is driven by the drive screw to open and close the door.

The rotation and the angular position of the shaft of the motor is, in some systems, sensed by an incremental optical encoder which has a rotor attached to the motor shaft and coaxial with the motor shaft. The rotor has indicia disposed in the angular direction around the rotor.

The indicia, for example, may be opaque angular segments separated by transparent angular segments. These segments may be formed on a flange which is coaxial with the motor shaft. An optical encoder may have a light emitting diode on one side of the rotor and a photoreceptor such as a photodiode on the other.

A single light emitting diode and photoreceptor provide a first pulsed binary signal as the motor rotates. A count of the pulses provides an indication of the angle through which the motor has rotated.

In order to determine the direction of rotation, a second photoreceptor is also generally employed. It observes the first light emitting diode or a second light emitting diode. It is positioned so that it provides a second pulsed binary signal which is in quadrature relationship to the first pulsed binary signal.

In a typical optical encoder, for example, there are 500 transparent segments each having an angular extent of 0.36 degrees. Likewise there are 500 opaque segments, each having an angular extent of 0.36 degrees. The opaque segments alternate with the transparent segments. Each transparent segment and its following opaque segment together occupy an angle of 0.72 degrees.

To obtain the quadrature signal, the second photoreceptor is located at an angular position of (N*0.72)+0.18 degrees relative to the first photoreceptor, N being any integer.

When the motor rotates in one direction, pulses obtained from the first photoreceptor precede the pulses from the second photoreceptor. When the motor rotates in the opposite direction, pulses from the second photoreceptor precede the pulses from the first photoreceptor. A signal processor or logical device which controls the motor is programmed to utilize the pulses from the first and second photoreceptors to determine the direction of rotation of the motor, as well as its angular velocity and, by summation, calculate the angle through which it has rotated. In this manner, the signal processor or logical device continually has information defining the position and velocity of the door.

Some commercially available encoders also have a third photoreceptor which observes a light emitting diode. These pass light through a portion of the rotor having, for example, one small transparent angular segment and one opaque angular segment covering the rest of the 360 degrees. These provide one index pulse per revolution of the rotor. This single index pulse is used to verify the position obtained from the quadrature signals.

Optical encoders are subject to deterioration with time, making their output susceptible to electrical noise, which may make the edges of the pulses uncertain. There may also be crosstalk between the signals obtained from the photoreceptors. In addition, there may also be spurious signals on the lines from the photoreceptors due to electromagnetic interference.

SUMMARY OF THE INVENTION

The present invention is an apparatus for testing an optical encoder used to determine a position of a moveable member. The moveable member may, for example only, be a rotary drive member in a transit vehicle door system. The optical encoder supplies a first binary signal indicative of an angular position of the moveable member and a second binary signal indicative of the angular position, the first binary signal and the second binary signal being in quadrature relationship. The apparatus includes a first delay device connected to receive the first binary signal and for producing a first delayed binary signal. The apparatus further includes a first logic gate connected to receive the first binary signal and the first delayed binary signal. The first logic gate produces a first edge detection pulse signal. The apparatus further includes a second delay device connected to receive the second binary signal and for producing a second delayed binary signal. The apparatus also includes a second logic gate connected to receive the second binary signal and the second delayed binary signal. Such second logic gate produces a second edge detection pulse signal. The first edge detection pulse signal and the second edge detection pulse signal are used to qualify the optical encoder.

In another aspect, the invention is a method of testing an optical encoder used to determine a position of a moveable member. The optical encoder supplies a first binary signal indicative of a position of the moveable member and a second binary signal indicative of the position, the first binary signal and the second binary signal being in quadrature relationship. The method includes producing a first delayed binary signal and combining the first binary signal with the first delayed binary signal to produce a first edge detection pulse signal. The method also includes producing a second delayed binary signal and combining the second binary signal with the second delayed binary signal to produce a second edge detection pulse signal. The first edge detection pulse signal and the second edge detection pulse signal are for qualifying the optical encoder.

OBJECTS OF THE INVENTION

It is, therefore, one of the primary objects of the present invention to provide an apparatus for detecting deterioration of an optical encoder used to determine the position and velocity of a moveable member.

An additional object of the present invention is to provide an apparatus for detecting deterioration of an optical encoder used to determine the angular position and velocity of a rotary drive member.

Another object of the present invention is to provide an apparatus for detecting deterioration of an optical encoder used to determine the position and velocity of a load which is moved by a rotary drive member.

Still another object of the present invention is to provide an apparatus for detecting noise in the signal from a photoreceptor in an optical encoder used to determine the angular position and velocity of a rotary drive member.

Yet another object of the present invention is to provide an apparatus for detecting noise in the signal from a photoreceptor in an optical encoder used to determine the position and velocity of a load which is driven by a rotary drive member.

A further object of the present invention is to provide an apparatus for detecting an overspeed condition of an electric motor having an optical encoder.

It is an additional object of the present invention to provide an apparatus for detecting an overspeed condition of a powered door which is driven by a rotary drive member.

Still yet another object of the present invention is to provide an apparatus for detecting failure of an incremental optical encoder.

Yet still another object of the present invention is to provide a method for detecting deterioration of an optical encoder used to determine the angular position and velocity of a rotary drive member.

Another object of the present invention is to provide a method for detecting deterioration of an optical encoder used to determine the position and velocity of a load which is moved by a rotary drive member.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
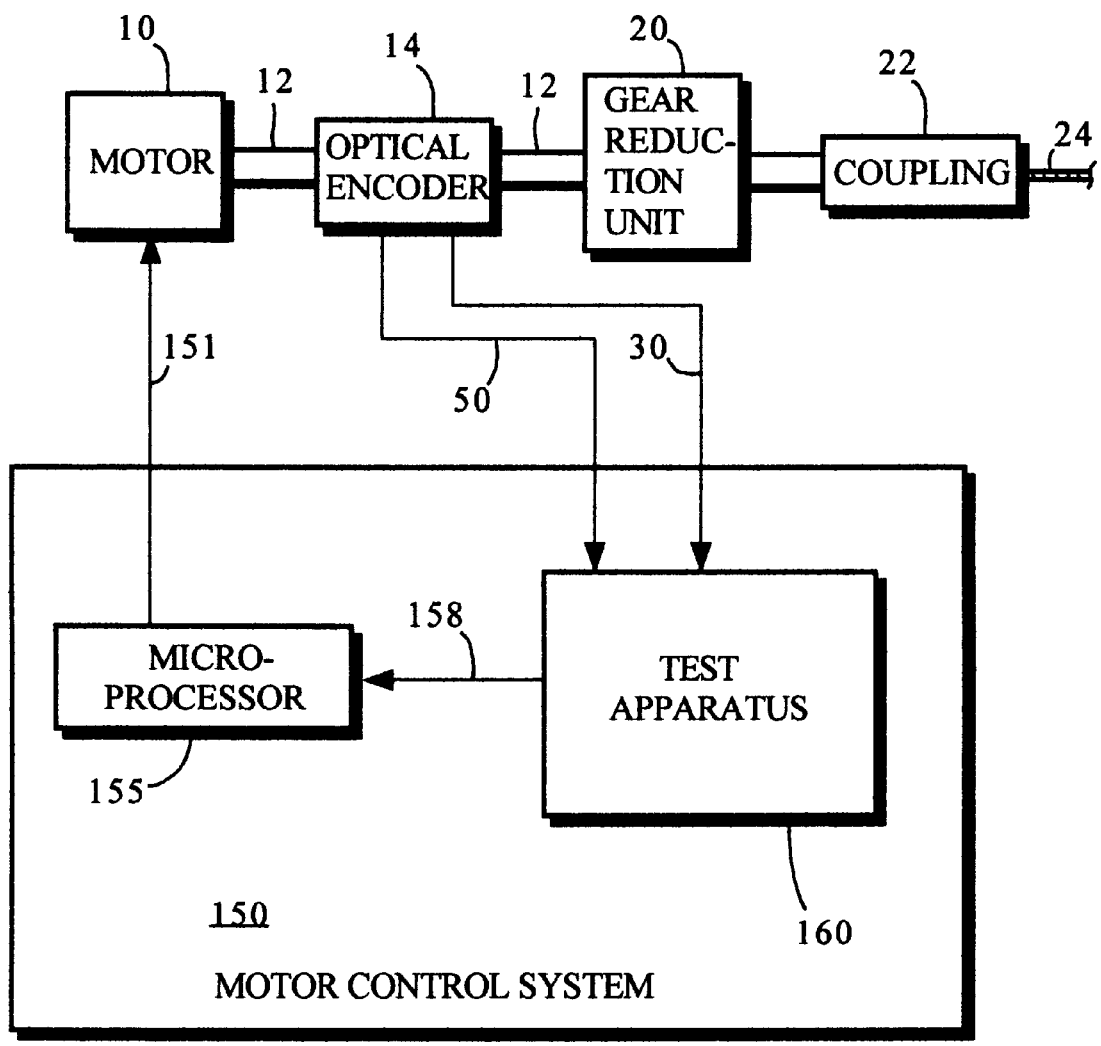
FIG. 1 is a schematic illustration which shows an embodiment of the invention connected to an optical encoder which determines angular position of a rotary drive member.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures for the sake of clarity and understanding of the invention.

Reference is now made to FIG. 1 which illustrates the invention in the context of the system for which the invention is particularly intended. Illustrated therein is a motor 10 having an output shaft 12 connected to optical encoder 14. A planetary gear reduction unit 20 is driven by shaft 12 and is connected to a helical drive member 24 through coupler 22. Helical drive member 24 moves a load which, in the presently preferred embodiment, is a door for a transit vehicle.

Optical encoder 14 provides output signals on lines 30 and 50 which are connected to a test apparatus 160, which is a part of motor control system 150. Motor control system 150 has a microprocessor 155 which controls motor 10 through a motor connection 151. Microprocessor 155 receives test information from the test apparatus 160 through signal line 158.

Figure 2:
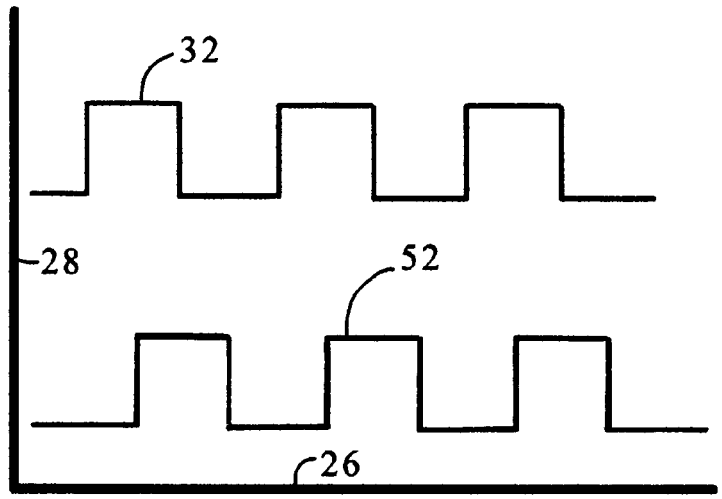
FIG. 2 is a temporal plot of the output signals from the encoder which shows their quadrature relationship.

The ideal form for the two outputs of the optical encoder 14 is shown as a temporal plot in FIG. 2. The abscissa 26 denotes time and the ordinate 28 denotes signal amplitude. FIG. 2 may, for example, be an oscilloscope trace of the two signals. The encoder output binary signal on signal line 30 is denoted 32 and the encoder output binary signal on signal line 50 is denoted 52.

Figure 3:
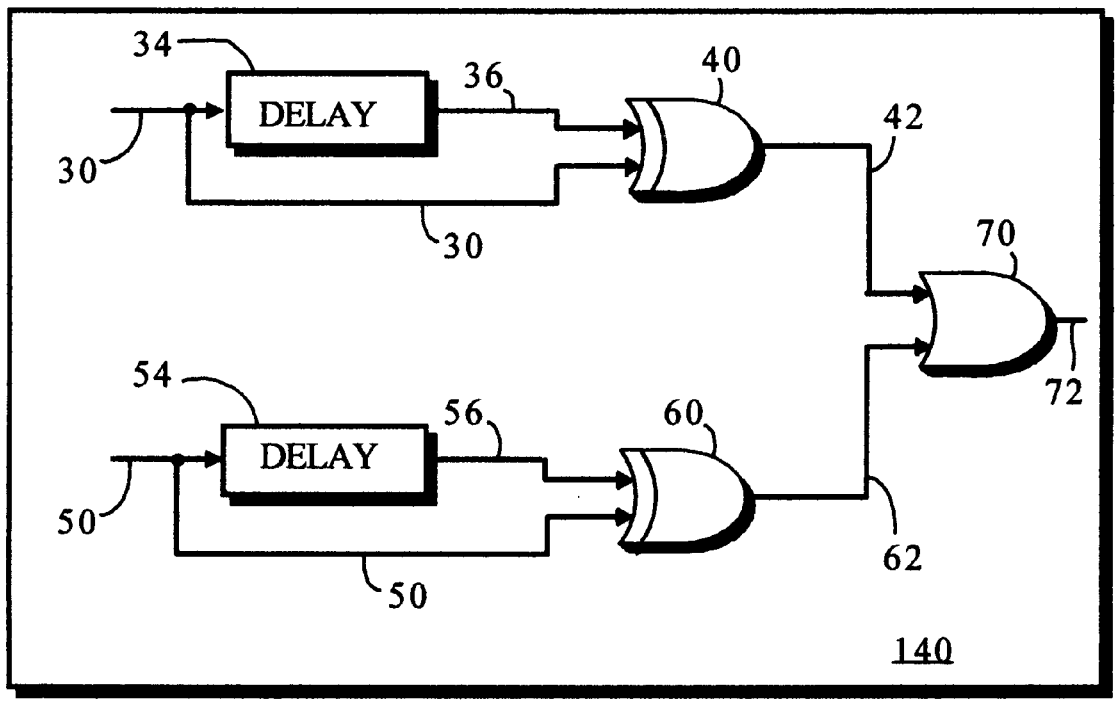
FIG. 3 is a schematic illustration of a presently preferred circuit which produces edge detection pulse signals for the two encoder outputs and a composite edge detection pulse signal.
Figure 4:
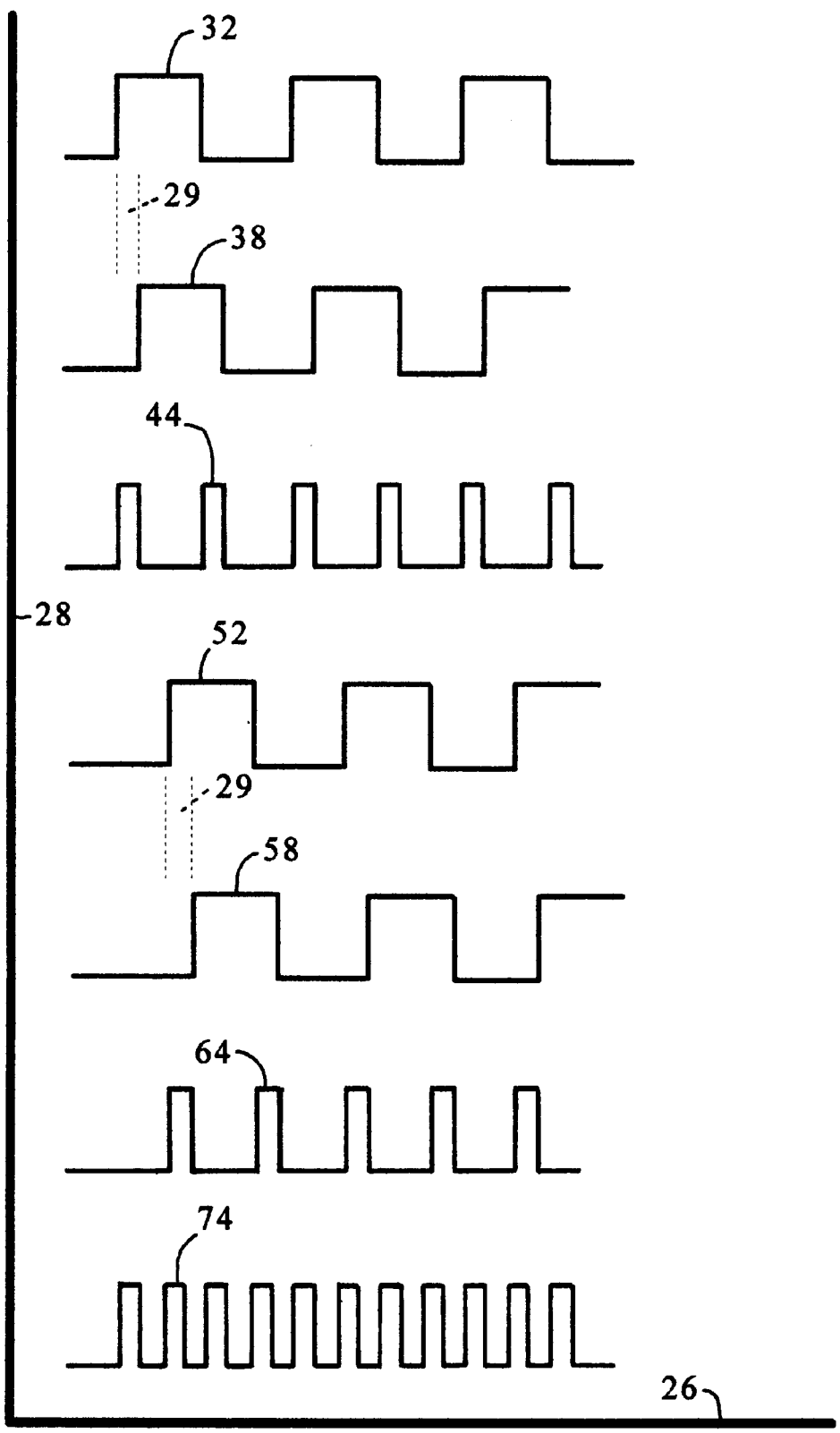
FIG. 4 is a plot of the encoder output signals, delayed encoder output signals, edge detection pulse signals and the composite edge detection pulse signal.

FIG. 3 illustrates circuitry which detects the edges of the pulses of signals 32 and 52 and FIG. 4 illustrates the edge detection pulse signals. First binary signal 32 on signal line 30 enters a delay device 34 which delays first binary signal 32 by a predetermined amount 29 to produce first delayed binary signal 38. First delayed binary signal 38 is conveyed on signal line 36 to a logical gate which, preferably, is an XOR gate 40. Signal line 30 is also connected to XOR gate 40. XOR gate 40 combines signals 32 and 38 to produce a first edge detection pulse signal 44. First edge detection pulse signal 44 is for qualifying optical encoder 14. A person skilled in the art will recognize that an XOR gate is an exclusive OR gate.

Second binary signal 52 on signal line 50 enters a delay device 54 which delays the second binary signal 52 by the predetermined amount 29 to produce a second delayed binary signal 58. Second delayed binary signal 58 is conveyed on signal line 56 to a logical gate which, preferably, is an XOR gate 60. XOR gate 60 combines signals 52 and 58 to produce a second edge detection pulse signal 64. Second edge detection pulse signal 64 is for qualifying optical encoder 14.

First edge detection pulse signal 44 is conveyed on signal line 42 to a logical device which, preferably, is an OR gate 70. Second edge detection pulse signal 64 is conveyed on signal line 62 to OR gate 70. The output of OR gate 70 is a composite edge detection pulse signal 74, which is placed on signal line 72. Composite edge detection pulse signal 74 is for qualifying optical encoder 14.

Figure 5:
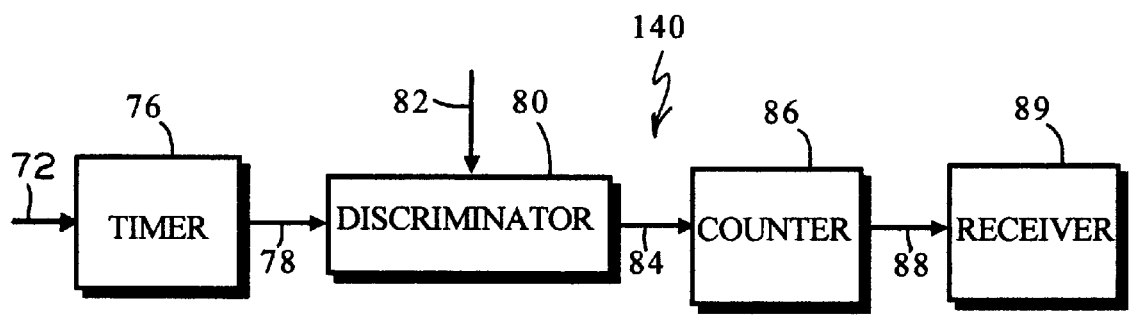
FIG. 5 is a schematic illustration of a presently preferred circuit which counts excessively short intervals between composite edge detection pulses.

FIG. 5 illustrates a circuit which provides a count of occasions in which two pulses of the composite edge detection pulse signal 74 are spaced in time with a time interval smaller than a predetermined time interval.

Composite edge detection pulse signal 74 is conveyed on signal line 72 to timer 76 which determines a time interval between pulses of signal 74. The output of timer 76 is conveyed on signal line 78 to discriminator 80 which compares the time interval between pulses with the predetermined time interval. Preferably, the predetermined time interval is determined from a requested speed signal for motor 10 which is received on signal line 82 from motor control microprocessor 155. The output of discriminator 80 is conveyed on signal line 84 to counter 86 which counts the occurrences of time intervals shorter than the predetermined time interval. The signal from counter 86 is conveyed on signal line 88 to register 89, where it is available to motor control computer 155. A person skilled in the art will recognize that register 89 may be included in counter 86. Preferably, motor control computer 155 periodically reads the count from register 89 and resets the count to zero. The count from register 89 provides indication of a number of malfunctions, including noise pulses on signal lines 30 and 50.

Figure 6:
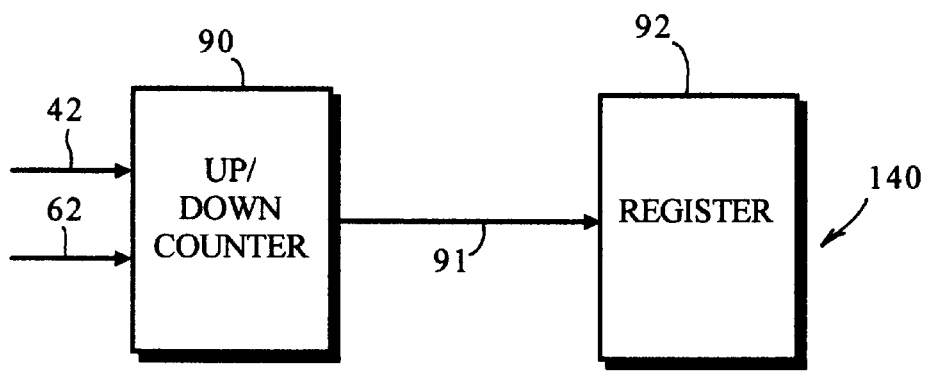
FIG. 6 is a schematic illustration of a presently preferred circuit which has an up-down counter to detect differing numbers of pulses from the two encoder outputs.

FIG. 6 is a circuit which provides an indication when differing numbers of pulses are received on signal lines 30 and 50. An up-down counter 90 receives first edge detection pulse signal 44 on signal line 42 and it receives second edge detection pulse signal 64 on line 62. Up-down counter 90 is incremented upwards for each pulse of signal 44 and is incremented downward for each pulse of signal 64. The difference in the number of pulses of signal 44 and 64 is conveyed by signal line 91 to register 92, where it is available to motor control computer 155. A person skilled in the art will recognize that register 92 may be included in counter 90. Preferably, motor control computer 155 periodically reads the count from register 92 and resets the count to zero. The count from register 92 provides indication of missing pulses or noise pulses on signal lines 30 and 50.

Figure 7:
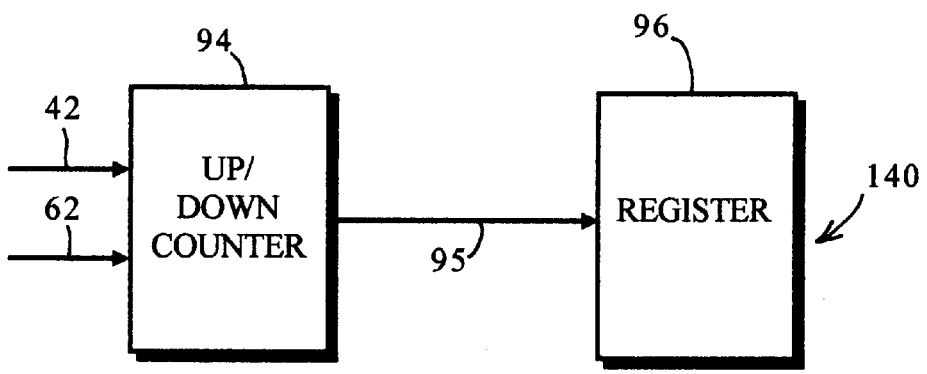
FIG. 7 is a schematic illustration of a presently preferred circuit which has an up-down counter to detect differing numbers of pulses from the two encoder outputs.

FIG. 7 is a circuit which is similar to the circuit shown in FIG. 6, except that counter 94 is incremented downward for each pulse of signal 44 and is incremented upwards for each pulse of signal 64. The difference in the number of pulses of signal 44 and 64 is conveyed by signal line 95 to register 96. A person skilled in the art will recognize that register 96 may be included in counter 94. Preferably, motor control computer 155 periodically reads the count from register 96 and resets the count to zero. The count from register 96 provides indication of missing pulses or noise pulses on signal lines 30 and 50.

Figure 8:
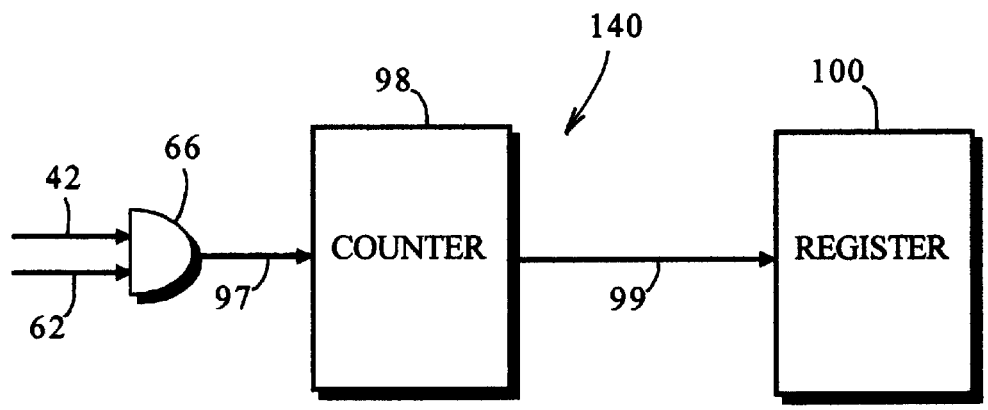
FIG. 8 is a schematic illustration of a presently preferred circuit which counts coincident pulses.

FIG. 8 illustrates a circuit which counts coincident pulse edges on signal lines 30 and 50. Coincident pulses may be caused by crosstalk between signal lines 30 and 50. Coincident pulses may also be caused by deterioration of optical encoder 14 which causes uncertainty in the pulse edges such that edges of pulses on lines 30 and 50 may overlap.

Logic gate 66, which preferably is an AND gate, receives first edge detection pulse signal 44 on signal line 42 and it receives second edge detection pulse signal 64 on signal line 62. The output of logic gate 66, which indicates coincident edges, is conveyed on line 97 to counter 98, and the count is conveyed on line 99 to register 100. The count is then available to motor control computer 155. a person skilled in the art will recognize that register 100 may be included in counter 98. Preferably, motor control computer 155 periodically reads the count from register 100 and resets the count to zero.

Figure 9:
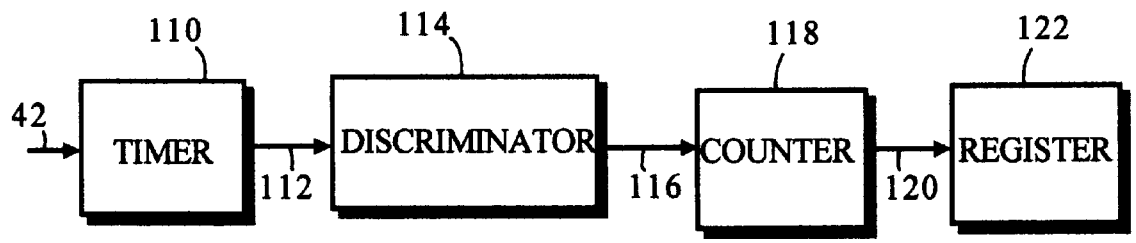
FIG. 9 is a schematic illustration of a presently preferred circuit which counts excessively short time intervals between edge detection pulses of one of the encoder outputs.

FIG. 9 illustrates a circuit which detects occurrences of excessively short intervals between pulses of signal 44. Signal 44 is conveyed on signal line 42 to timer 110 which measures the time between pulses. The time is conveyed by signal line 112 to discriminator 114 which determines whether the time between pulses is shorter than a predetermined time. Such occurrences are indicated on line 116 and counted in counter 118. The count passes by signal line 120 to register 122. The count is then available to motor control computer 155. A person skilled in the art will recognize that register 122 may be included in counter 118. Preferably, motor control computer 155 periodically reads the count from register 122 and resets the count to zero.

Figure 10:
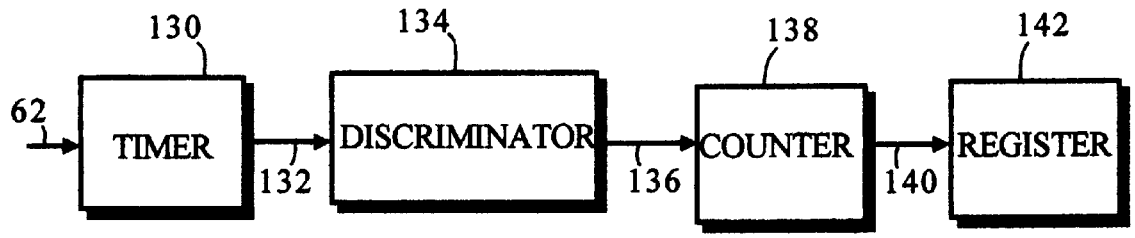
FIG. 10 is a schematic illustration of a presently preferred circuit which counts excessively short time intervals between edge detection pulses of the other encoder output.

FIG. 10 illustrates a circuit which detects occurrences of excessively short intervals between pulses of signal 64. Signal 64 is conveyed on signal line 62 to timer 130 which measures the time between pulses. The time is conveyed by signal line 132 to discriminator 134 which determines whether the time between pulses is shorter than a predetermined time. Such occurrences are indicated on line 136 and counted in counter 138. The count passes by signal line 140 to register 142. The count is then available to motor control computer 155. A person skilled in the art will recognize that register 142 may be included in counter 138. Preferably, motor control computer 155 periodically reads the count from register 142 and resets the count to zero.

One of the malfunctions indicated by the circuits in FIGS. 9 and 10 is a loss of either signal 32 or 52 due to failure of optical encoder 14, or failure of signal lines 30 or 50. Loss of signal 32 causes motor 10 to accelerate to an excessive speed, causing short time intervals between pulses of signal 52. Loss of signal 52 also causes motor 10 to accelerate to an excessive speed, causing short time intervals between pulses of signal 32.

In all of the circuits above which have a counter connected to a register, the register could be formed as a portion of the counter.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit of the invention or the scope of the appended claims.

I claim:

1. An apparatus for testing an optical encoder used to determine a position of a moveable member, such optical encoder supplying a first binary signal indicative of a position of such moveable member and a second binary signal indicative of such position, such first binary signal and such second binary signal being in quadrature relationship, said apparatus comprising:

(a) a first delay device connected to receive such first binary signal, said first delay device producing a first delayed binary signal;

(b) a first logic gate connected to receive such first binary signal and said first delayed binary signal, said first logic gate producing a first edge detection pulse signal;

(c) a second delay device connected to receive such second binary signal, said second delay device producing a second delayed binary signal; and (d) a second logic gate connected to receive such second binary signal and said second delayed binary signal, said second logic gate producing a second edge detection pulse signal, said first edge detection pulse signal and said second edge detection pulse signal for qualifying such optical encoder.

2. A test apparatus, according to claim 1, wherein said first logic gate is an XOR gate.

3. A test apparatus, according to claim 1, wherein said second logic gate is an XOR gate.

4. A test apparatus, according to claim 1, wherein said apparatus further includes a third logic gate connected to receive said first edge detection pulse signal and said second edge detection pulse signal and said third logic gate providing a composite edge detection pulse signal for qualifying such optical encoder.

5. A test apparatus, according to claim 4, wherein said third logic gate is an OR gate.

6. A test apparatus, according to claim 4, wherein said apparatus further includes:

a timer connected to receive said composite edge detection pulse signal for producing a time interval signal indicative of a first time interval between pulses of said composite edge detection pulse signal;

a discriminator connected to receive said time interval signal for detecting occurrences in which said first time interval is shorter than a predetermined second time interval and for producing a discriminator output signal; and a counter connected to receive said discriminator output signal for counting said occurrences in which said first time interval is shorter than said predetermined second time interval and for generating an occurrence rate signal indicative of a rate of said occurrences, said occurrence rate signal being for at least one of detecting noise pulses from such optical encoder and detecting an overspeed condition of such moveable member.

7. A test apparatus, according to claim 6, wherein said test apparatus further includes a register connected to receive said occurrence rate signal and for holding said occurrence rate signal.

8. A test apparatus, according to claim 6, wherein said discriminator is further connected to receive a requested speed signal indicative of a requested rotary speed of such moveable member and to determine said second time interval based on such requested speed signal.

9. A test apparatus, according to claim 1, wherein said apparatus further includes an up-down counter connected to receive said first edge detection pulse signal and said second edge detection pulse signal and to produce a difference count signal which is incremented one of upwards and downwards for each pulse of said first edge detection pulse signal and being incremented one of downwards and upwards, respectively, for each pulse of said second edge detection pulse signal and wherein said difference count signal detects a loss of a phase of such optical encoder.

10. A test apparatus, according to claim 9, wherein said apparatus further includes a register connected to receive said difference count signal.

11. A test apparatus, according to claim 1, wherein said test apparatus further includes a third logic gate connected to receive said first edge detection pulse signal and said second edge detection pulse signal for providing a coincident pulse signal, said coincident pulse signal used for at least one of detecting crosstalk between signal lines carrying such first binary signal and such second binary signal and detecting deterioration of such optical encoder.

12. A test apparatus, according to claim 11, wherein said third logic gage is an AND gate.

13. A test apparatus, according to claim 11, wherein said apparatus further includes a coincidence counter connected to receive said coincident pulse signal for providing a coincidence count signal at an output terminal thereof.

14. A test apparatus, according to claim 13, wherein said apparatus further includes a coincidence count register connected to receive said coincidence count signal.

15. A test apparatus, according to claim 1, wherein said apparatus further includes:

a timer connected to receive said first edge detection pulse signal for producing a time interval signal indicative of a time interval between pulses of said first edge detection pulse signal;

a discriminator for detecting occurrences in which said time interval is shorter than a predetermined time interval and said discriminator produces a discriminator output signal; and a counter connected to receive said discriminator output signal for producing a discriminator count signal.

16. A test apparatus, according to claim 15, wherein said apparatus further including a register connected to receive said discriminator count signal and for holding said discriminator count signal.

17. A test apparatus, according to claim 1, wherein said apparatus further includes:

a timer connected to receive said second edge detection pulse signal for producing a time interval signal indicative of a time interval between pulses of said second edge detection pulse signal;

a discriminator for detecting occurrences in which said time interval is shorter than a predetermined time interval and said discriminator produces a discriminator output signal; and a counter connected to receive said discriminator output signal for producing a discriminator count signal.

18. A test apparatus, according to claim 17, wherein said apparatus further includes a register connected to receive said discriminator count signal and for holding said discriminator count signal.

19. A method of testing an optical encoder used to determine a position of a moveable member, said optical encoder supplying a first binary signal indicative of a position of said moveable member and a second binary signal indicative of said position, said first binary signal and said second binary signal being in quadrature relationship, said method comprising:

(a) producing a first delayed binary signal;

(b) combining said first binary signal and said first delayed binary signal to produce a first edge detection pulse signal;

(c) producing a second delayed binary signal;

(d) combining said second binary signal and said second delayed binary signal to produce a second edge detection pulse signal; and (e) qualifying said optical encoder by said first edge detection pulse signal and said second edge detection pulse signal.

* * * * *